UNITED STATES PATENT OFFICE 2,480,478

SYNTHETIC RUBBER COMPOSITIONS

Nicholas L. Kalman, Rutherford, N. J., assignor, by mesne assignments, to Pierce Laboratory, Inc., New York, N. Y., a corporation of New York No Drawing. Application September 22, 1943, Serial No. 503,419

9 Claims. (Cl. 260—23.7)

This invention relates to the compounding of synthetic rubbers, and more particularly to the compounding of synthetic rubbers of the type consisting of or incorporating a butadiene-styrene co-polymer, various synthetics of this type being commonly referred to as Buna-S or GR-S.

Difficulty has been encountered in compounding elastomers of this general class to meet many of the potential uses. Naturally, for various purposes the balance of various properties must be different than the balance of properties required for other purposes. This is particularly true with respect to the balance as between tensile strength, elongation, tear resistance (both hot and cold), and modulus.

The Buna-S type of synthetic rubber above mentioned does not by itself or in known formulations have adequate tensile strength, elongation and tear resistance to meet certain purposes, and in addition known formulations of Buna-S which have been designed to increase the values of these properties have frequently resulted in a compound in which the modulus was too high for many purposes.

The present invention is primarily concerned with a formulation or compound of the Buna-S type, incorporating other ingredients mentioned hereinafter, which formulation is, in general, characterized by an increase in tensile strength and in elongation, a very substantial increase in tear resistance, both hot and cold, and also a relatively low modulus, as compared with known formulations. The balance of these properties may be adjusted in various ways, according to the invention, whereby to change one or more of the values, and thus to secure compounds which are suitable to quite a wide variety of purposes.

In connection with the general balance of properties achieved by the invention, it may be mentioned that the high tear resistance and low modulus, usually coupled with at least some increase in tensile and elongation, is of value for purposes such as inner tubes for automobile tires and also for overshoes or rubber footwear. The increase in hot tear resistance is of particular advantage for purposes such as the inner tubes of tires which, in service, are commonly subjected to temperatures considerably above that of the atmosphere. The improvement and balance of properties brought about by the present invention is also of importance for many other uses, especially where high tear resistance and low modulus are required.

In addition to the desirable balance of properties above discussed it may also be mentioned that certain formulations according to the invention also yield vulcanized products showing improvement with respect to retention of tensile strength and elongation after prolonged periods of heating.

Still further, the invention has in view a Buna-S type formulation incorporating a plasticizer or fortifier of a type which is easily prepared and of exceptionally low cost and which, moreover, may readily be worked into the rubber on the mill, thereby facilitating the required milling operation.

An important characteristic of the formulation herein contemplated is the employment of sulfurized tall oil, especially in combination with certain types and proportions of carbon blacks, and notably with a semi-reenforcing furnace black. The proportions of ingredients and treatment procedures are discussed more fully hereinafter, but here it is mentioned that tall oil is an inexpensive by-product of the manufacture of paper pulp, being available in large quantities. It is an acidic material chiefly comprised of rosin acids and fatty acids, roughly in equal proportions. According to the invention the tall oil, either crude, refined, or otherwise treated, for instance by heat treatment or distillation, is sulfurized and thereafter compounded with the rubber and other ingredients. Before considering the compounding, attention is here directed to the preferred conditions for sulfurization of the tall oil to be used.

It may also be mentioned that a prepared mixture of semi-drying fatty acids, such as soya bean fatty acids, with rosin, in the proportion of about 50% of each, which generally simulates the approximate composition of tall oil, may be used in place of tall oil.

From about 1% to about 25% of sulfur may be added to the tall oil, depending upon the ultimate properties desired in the rubber compound, although for most purposes I prefer to use sulfur in the range extending from about 5% to about 20%. Where relatively high percentages of sulfur are used, any free sulfur may be eliminated if desired, as by use of solvents.

The tall oil being prepared is heated to a temperature between about 120° C. and 250° C., the temperature being selected in accordance with properties desired in the rubber compound in which the sulfurized tall oil is ultimately to be used. I have found that for many purposes highly advantageous results are secured when employing heat between about 140° C. and 180 or 200° C.

With respect to the ranges of percent of sulfur and temperature above mentioned, especially the temperature, it is pointed out that at temperatures upward of about 140° C. at least some of the sulfur which has been combined may again be removed, such removal being accompanied by evolution of hydrogen sulfide. Sulfurization at a temperature below about 140° C. yields a product in which substantially all of the sulfur added remains. The sulfurized tall oil products in which most of the sulfur is retained have properties differing from those products which have been heated under conditions partially desulfurizing the material. These differences not only involve a difference in the percentage of sulfur present but also in other properties of the treated tall oil, for instance the unsaturation thereof, as is evidenced by a change in the iodine number of the tall oil.

The time of sulfur treatment and/or heating at desulfurization temperatures may also be varied to meet different conditions or properties required. Moreover, other variables may be introduced, for instance the heating may be carried out in more than one stage, for example the tall oil may be initially heated with the sulfur at a temperature not above 140° C., the temperature being thereafter raised to a point substantially above 140° C., which multi-stage heating results first in actual addition of the sulfur to the rosin and fatty acid molecule of the tall oil, and thereafter in separation of at least a portion of the added sulfur.

The percentage of sulfur, temperature and time of heating may be relatively adjusted so as to control the extent of the sulfurization process, and thereby vary the physical consistency and other properties of the sulfurized tall oil. It may be mentioned, however, that sulfurization of tall oil according to the procedures referred to above yields a product which is more or less viscous and of sticky character.

In addition to the crude, refined, distilled, or heat treated tall oil as a whole, various constituents or fractions of tall oil may also be employed according to the invention, by sulfurizing such constituents or fractions and subsequently compounding them with the Buna-S rubber.

A specified sulfurized tall oil product well adapted to the purposes of the present invention is one prepared from crude tall oil by heating the tall oil with 10% of sulfur at a temperature of 160° C. for 4 hours. As another specific example, refined tall oil may be used, for instance, tall oil refined by distillation and separation of the crystallizable part of the rosin constituents, the liquid portion then being treated with 5% sulfur at a temperature of 140° C. for 1½ hours. A third example is the sulfurization of heat treated tall oil. This is accomplished by preliminarily heating the crude tall oil to a temperature of 300° C. for a few hours, after which 10% of sulfur is added and the temperature maintained at 160° C. for 4 hours.

The tall oil may be sulfurized either with or without the presence of accelerators and/or activators, such as mercaptobenzothiazole.

Having prepared the sulfurized tall oil, it is compounded with the rubber and other ingredients on the rubber mill, in accordance with common practice.

With regard to the formulation to be employed, reference is first made to the black to be used.

As is known, in order to impart increased tensile strength, and for improvement of certain other properties, it is customary to load Buna-S type rubber compounds with various types of blacks.

According to the present invention, the formulation here contemplated most desirably employs a semi-reenforcing furnace black, for instance Kosmos 20 (United Carbon Co.), Gastex (Atlas Chemical Co.), Furnex (Columbian Carbon Company) and Sterling (Godfrey L. Cabot, Inc.), for those purposes where high tear resistance and/or low modulus are desirable.

Extensive improvement in cold and hot tear resistance and reduction in modulus is achieved by employing the tall oil in combination with semi-reenforcing blacks. However, some improvement in cold tear resistance and some slight lowering of modulus is present even when employing certain reenforcing blacks, such as channel black, in formulations of the type used in such as P-33 black (Thermatomic Carbon Company).

Moreover, when vulcanized tall oil is compounded with reenforcing blacks, such as channel black, in formulations of the type used in pneumatic tire treads, I have found that the compound vulcanized from this formulation shows additional properties which may aid in overcoming a weakness which Buna-S synthetic rubber exhibits when compounded into pneumatic tire treads, namely, a tendency to crack and cut rapidly under conditions induced by the heat of running. I believe this tendency may be at least reduced by the relatively high retention of elongation and tensile strength after prolonged heating which is manifested by certain formulations according to this invention.

Mixtures of blacks of different types may be used.

The proportions of the black and of the sulfurized tall oil to be employed will vary in accordance with the desired properties of the compound being prepared. The amount of sulfurized tall oil used should be from about 1 to 25% of the quantity of butadiene-styrene co-polymer, although for special purposes it may even be possible to use as much as 50%. Very advantageous results from the standpoint of high tensile, elongation, tear and low modulus are secured when employing from about 8 to 12% of the sulfurized tall oil on the basis of the elastomer present.

The quantity of black may also be varied as already mentioned, but the quantity usually lies between about 20% and 100% on the basis of the elastomer present. Maximum results from the standpoint of tear resistance and tensile strength, when employing semi-reenforcing black, are usually achieved within the range of from about 40% to about 60% of the semi-reenforcing black, although this will depend on the balance of other ingredients used.

Various types of accelerators may also be employed. Many are well known to the trade and they are usually advantageously employed in the present invention. Some of the known accelerators indicate increased effect as compared with others, and in addition various activators also show somewhat different results. I have found an effective combination to be the accelerator benzothiazyldisulfide, together with an activator known in the trade as Barak (E. I. du Pont de Nemours & Co.).

It may be mentioned that the formulation may include ingredients other than those already identified; the butadiene-styrene co-polymer, the sulfurized tall oil and the semi-reenforcing black are, however, the three important constituents from the standpoint of high tear resistance and low modulus. Rubbers other than the Buna-S type, either natural or synthetic may be present in addition to the three primary ingredients of the formulation just referred to.

Since the formulation may be varied in a number of respects in order to adjust or balance various of the properties, and since a given property, for instance tear resistance or tensile strength may be changed by varying any one of several different factors with respect to the composition or treatment, there are given just below values for various of the properties which are preferred in the practice of this invention in order to provide a Buna-S type compound suitable for many purposes for which the Buna type has not heretofore been well adapted.

With respect to tear resistance, the invention contemplates control of the formulation to secure a cold tear of at least 140 lbs. (per inch of width of the tear), and preferably upwards of 190 lbs. The formulation should further be such that the hot tear is at least 75 and preferably above 90 lbs.

Tensile strength should be upwards of 1200 lbs. (per square inch at rupture), and most advantageously above 1600 lbs. For many purposes, even higher tensile is desirable, for example above 2400 lbs., and this may be attained with certain formulations.

Elongation (% elongation at rupture) should be at least 650% but usually over 700%, for purposes for which the formulations of this invention are particularly adapted.

The modulus may be varied considerably, depending upon proportions of ingredients and the nature of the addition agents, loading of sulfurized tall oil and of black, etc., but for many purposes for which the formulations of the present invention are well suited the modulus (the force—in lbs.—required per square inch to maintain elongation to a given degree) should not be over 500 lbs., at 300% elongation, and most desirably not over 450 lbs. For some purposes, the modulus need not be as low as these values, but may be even as high as about 700 lbs. This may be controlled by variation of the pigment loading.

It may here be mentioned that in the examples given hereinafter, the modulus is given for 300% elongation, unless otherwise indicated. Moreover, the tear resistance as mentioned in the examples was determined by the Winkleman test, for which purpose substantially crescent-shaped tear test pieces were employed having one incision. Still further, note that the cold tear tests were made at room temperature, the hot tear tests at 70° C., unless otherwise indicated.

The results secured in accordance with this invention are quite outstanding in the field for which compounds predominating in the characteristics above emphasized are suited. As compared with the Buna-S type rubber without a plasticizing type addition agent, the improvement secured by the employment of sulfurized tall oil in combination with semi-reenforcing black is very extensive. Moreover the particular balance of properties contemplated by this invention is achieved to a much greater extent than is possible when employing certain known plasticizing ingredients, such as pine tar, or the material identified by the name Bardol (made by The Barrett Company).

EXAMPLES

Examples of a number of specific preferred formulations are given herebelow. In connection with these examples, it should be kept in mind that the absolute figures given for various characteristics naturally will vary somewhat from batch to batch, depending upon a number of factors and especially upon the particular batch of Buna-S type rubber being employed. The Buna-S type rubber not only has somewhat differing characteristics as produced in different plants but in addition, even from a given plant, the characteristics vary somewhat from batch to batch. Other factors also influence the absolute figures, including the room temperature at the time of testing, etc. These variables, and their influence on the values given in the tables below should be kept in mind not only in connection with the absolute figures themselves but also in connection with comparisons which are made between formulations according to the present invention and certain other formulations.

COMPARATIVE EXAMPLES 1–7

In these examples sulfurized tall oil was prepared by heating crude tall oil with 10% of sulfur for 4 hours at 160° C. This sulfurized tall oil was then incorporated in the formulations of the several examples, the formulations for each being the same except for a variation in the quantity of black employed, in this case a semi-reenforcing furnace black. The formulation was as follows, all figures indicating parts by weight:

FORMULATION A

| | Parts |
|---|---|
| Butadiene-styrene co-polymer | 100.00 |
| Age Rite Powder (an anti-oxidant sold by R. T. Vanderbilt Co.) | 1.00 |
| Altax (an accelerator—benzothiazyldisulfide—sold by R. T. Vanderbilt Co.) | 1.50 |
| Barak (an activator made by E. I. duPont de Nemours & Co.) | 1.00 |
| Zinc oxide | 2.50 |
| Sulfur | 1.75 |
| Kosmos 20 (a semi-reenforcing black made by United Carbon Co.)—see Table I below. | |
| Sulfurized tall oil | 10.00 |

The foregoing ingredients were milled together and thereafter the material was vulcanized at 138° C. Several different vulcanization times were employed and the optimum, i. e., the highest tensile strength, was secured at 25 minutes. The figures for the optimum cures, i. e., tensile strength, modulus, elongation, and cold and hot tear are given in Table I just below.

*Table I*

VARIATION OF LOADING OF SEMI-REENFORCING BLACK

| Ex. No. | Percent of Black to Buna-S | Tens. | Mod. | Elong. | Tear Cold | Tear Hot |
|---|---|---|---|---|---|---|
| 1 | 30 | 1,060 | 270 | 720 | 138 | 67 |
| 2 | 35 | 1,400 | 320 | 820 | 188 | 78 |
| 3 | 40 | 1,650 | 390 | 820 | 206 | 94 |
| 4 | 45 | 1,730 | 420 | 830 | 247 | 108 |
| 5 | 50 | 1,820 | 550 | 740 | 254 | 153 |
| 6 | 55 | 1,720 | 630 | 720 | 279 | 164 |
| 7 | 60 | 1,730 | 680 | 710 | 293 | 182 |

Analysis of the foregoing indicates relatively low modulus and relatively high elongation and tear resistance. Moreover, this balance of the characteristics just mentioned, which is of importance for certain purposes as hereinabove mentioned, is secured, while at the same time maintaining relatively high tensile strength. The influence of variation of black loading is also plainly indicated in the table. With relatively high loadings, the tear resistance and tensile strength are both at relatively high values, while at a loading of about 40% of black, the tensile and tear not only show quite good values but in addition the elongation is relatively high and the modulus is relatively low. This loading of 40% of black, therefore, is quite advantageous for many purposes requiring low modulus, high elongation and good tear.

The values of Example 3 (40% black loading) are compared in Tables IIa and IIb below with the same Buna-S type formulation except for two variations, as follows: In one comparison, identified by the letter A in Table IIa the formulation was exactly the same as that given above except that no plasticizer type addition agent was included. In a second comparison, identified as B, exactly the same formulation was employed except that in place of the sulfurized tall oil, a known type of plasticizing addition was used, i. e., Bardol, a coal tar distillate made by The Barrett Company (recommended for use in comparisons, on pages 221-2 of the Bulletin, dated January 4, 1943, of the War Production Board, office of the Rubber Director, entitled "Standard methods of compound evaluation and for reporting test data").

The absolute figures for the two comparisons just mentioned are given in Table IIa just below.

*Table IIa*

COMPARISONS AT 40% SEMI-REENFORCING BLACK LOADING

| Ex. No. | Addition | Tens. | Mod. | Elong. | Tear | |
|---|---|---|---|---|---|---|
| | | | | | Cold | Hot |
| 3 | Sulfurized Tall Oil | 1,650 | 390 | 820 | 206 | 94 |
| A¹ | None | 1,800 | 930 | 480 | 105 | 54 |
| B | Bardol | 1,180 | 580 | 530 | 104 | 60 |

¹ Optimum cure=30 minutes at 138° C., as compared with the optimum for the other two, which was 25 minutes at 138° C.

Since, as above mentioned, the absolute values for different characteristics will vary in accordance with such variables as non-uniformity in the Buna-S type rubber employed, etc., a comparative index is given in Table IIb below, the index being based on the absolute figures given above, and showing representative comparative results to be expected even where the absolute figures lie in somewhat different ranges. The basis of this comparison is as follows. Assuming that the tensile, modulus, etc. values for the blank Example A represent an index of 100, then the tensile, modulus, etc. values for Example 3 may be represented as percentages of the index figure. Thus, from Table IIb it will be seen that the modulus of Example 3 is 42% of the modulus of blank Example A, the cold tear being 196%.

A similar index comparison is included in Table IIb with reference to the "Bardol" Example B.

*Table IIb*

INDEX COMPARISONS AT 40% SEMI-REENFORCING BLACK LOADING

| Comparison | Tens. | Mod. | Elong. | Tear | |
|---|---|---|---|---|---|
| | | | | Cold | Hot |
| Index of Ex. 3 as compared with Buna-S having no plasticizer addition | 92 | 42 | 171 | 196 | 174 |
| Index of Ex. 3 as compared with Buna-S compounded with Bardol | 140 | 67 | 155 | 198 | 157 |

The figures above indicate the extensive modification in properties which is attainable in accordance with the present invention.

Formulations similar to the above were also employed, except for the use of a semi-reenforcing black of a different make, the results being similar to those already indicated. Specifically, Gastex, a semi-reenforcing black made by Atlas Chemical Co. was used and gave similar results.

COMPARATIVE EXAMPLES 8-13

Two variables were introduced in two groups of examples here considered, Examples 8-10 being one group and Examples 11-13 being the other. As between the two groups, the only difference was that the sulfurized tall oil employed was sulfurized at a different temperature. As between the examples of each group, the amount of sulfurized tall oil was varied.

In Examples 8, 9 and 10 the tall oil was prepared in exactly the same manner as described above in connection with Examples 1-7, i. e., crude tall oil was sulfurized with 10% of sulfur for 4 hours at 160° C. In this group, the formulation was in accordance with Formulation A above, except that the quantity of semi-reenforcing black was maintained constant at 40% loading, and except that the quantity of sulfurized tall oil here employed was varied as is indicated in the table just below. The figures given in Table IIIa (as well as in Table IIIb) represent those for the optimum cure (time) at 138° C.

*Table IIIa*

VARIATION OF AMOUNT OF TALL OIL SULFURIZED AT 160° C.

| Ex. No. | Percent of Tall Oil to Buna-S | Tens. | Mod. | Elong. | Tear | |
|---|---|---|---|---|---|---|
| | | | | | Cold | Hot |
| 8 | 5 | 1,870 | 550 | 770 | 194 | 72 |
| 9 | 10 | 1,830 | 450 | 860 | 200 | 103 |
| 10 | 15 | 1,700 | 310 | 930 | 204 | 80 |

The results secured from variation in the amount of sulfurized tall oil prepared by heating crude tall oil with 10% sulfur for 4 hours at 140° C. is indicated in Table IIIb just below. Here again the formulation was the same as Formulation A above, the black loading being at 40% and the amount of tall oil varied.

*Table IIIb*

VARIATION OF AMOUNT OF TALL OIL SULFURIZED AT 140° C.

| Ex. No. | Percent of Tall Oil to Buna-S | Tens. | Mod. | Elong. | Tear | |
|---|---|---|---|---|---|---|
| | | | | | Cold | Hot |
| 11 | 5 | 1,920 | 620 | 730 | 206 | 86 |
| 12 | 10 | 1,950 | 500 | 855 | 215 | 84 |
| 13 | 15 | 1,720 | 340 | 935 | 202 | 76 |

In the two tables above (IIIa and IIIb) it appears that this variation of the amount of sulfurized tall oil does not appreciably influence the cold tear resistance, although the hot tear is somewhat altered, being at a maximum in Table IIIa at 10% loading of sulfurized tall oil. Modulus tends to decrease with increase in percentage of tall oil used and in addition elongation is indicated as uniformly increasing with increase in percentage of tall oil. Tensile strength is in a relatively high range throughout, tending to decrease somewhat at the higher loadings of the sulfurized tall oil. As between the two types of sulfurized tall oil it may be observed that certain tensile values are higher in Table IIIb than in Table IIIa, as are also the modulus figures.

COMPARATIVE EXAMPLES 14-17

In this group the tall oil employed was crude tall oil, sulfurized with 10% of sulfur for 4 hours at 160° C. The formulation was again the same as Formulation A above but instead of employing a semi-reenforcing black, a fine thermal black was used, i. e., a black known to the trade as P-33, made by Thermatomic Carbon Company. The quantity of black was varied as between the several examples and characteristics were as indicated in Table IV below.

Table IV

VARIATION OF AMOUNT OF FINE THERMAL BLACK

| Ex. No. | Per Cent of Black to Buna-S | Tens. | Mod. | Elong. | Tear | |
|---|---|---|---|---|---|---|
| | | | | | Cold | Hot |
| 14 | 50 | 1,850 | 300 | 850 | 138 | 74 |
| 15 | 55 | 2,000 | 300 | 850 | 169 | 86 |
| 16 | 60 | 1,850 | 320 | 830 | 190 | 97 |
| 17 | 65 | 2,080 | 380 | 850 | 186 | 102 |

Because of the difference in the type of black and the range of black loading, this formulation is useful for purposes somewhat different than those discussed above.

Although, as is mentioned above, the employment of sulfurized tall oil secures the most extensive decrease of modulus and increase of tear resistance in formulations employing semi-reenforcing black, nevertheless, as compared with the employment of other plasticizing type addition agents, the sulfurized tall oil also is of advantage for certain purposes in formulations employing other types of black, such as the fine termal black used in the examples of Table IV above. Elongation and tensile in this formulation are also somewhat higher than the average values for these characteristics in formulations employing semi-reenforcing black.

COMPARATIVE EXAMPLES 18-21

Results somewhat similar to those referred to just above are indicated when employing various reenforcing blacks, such for instance as Kosmobile 77, an easy processing channel black made by United Carbon Company. This particular black (Kosmobile 77) was employed in Examples 18-21 in combination with sulfurized tall oil prepared at 160° C. by heating 4 hours with 10% of sulfur. Here again the formulation was according to Formulation A above, except for substitution of the Kosmobile 77 in place of Kosmos 20.

The values for the optimum cure (here 40 minutes at 138° C.) are given in Table V just below.

Table V

VARIATION OF AMOUNT OF REENFORCING BLACK

| Ex. No. | Per Cent of Black to Buna-S | Tens. | Mod. | Elong. | Tear | |
|---|---|---|---|---|---|---|
| | | | | | Cold | Hot[1] |
| 18 | 25 | 1250 | 300 | 660 | 160 | 63 |
| 19 | 30 | 1600 | 300 | 720 | 212 | 78 |
| 20 | 35 | 1620 | 420 | 680 | 264 | 133 |
| 21 | 40 | 2180 | 600 | 660 | 324 | 235 |

[1] Hot tear at 100° C.

In comparison with employment of certain other known plasticizing agents the modulus figures above are somewhat lower and in addition the tear resistance figures are somewhat higher, especially the hot tear, in which connection it is noted that the hot tear for this group of examples was determined at 100° C.

EXAMPLE 22

In this example a formulation of the pneumatic tire tread type was used, as follows:

FORMULATION B

| | Parts |
|---|---|
| Butadiene-styrene co-polymer | 100.00 |
| Mercaptobenzothiazole | 1.50 |
| Diphenylguanidine | .20 |
| Zinc oxide | 5.00 |
| Sulfur | 2.00 |
| Kosmobile 77 (an easy processing channel black made by the United Carbon Company) | 50.00 |
| Sulfurized tall oil | 10.00 |

The sulfurized tall oil used was prepared by heating crude tall oil with 10% sulfur for 4 hours at 160° C.

The optimum cure at 144° C. was found to be 75 minutes. Tests of the vulcanized compound show a tensile strength of 2750 lbs., a modulus of 950 lbs. at 300% elongation, elongation of 640%, and cold tear resistance of 388 lbs.

The vulcanized compound was aged in an oven for 24 hours at 100° C. and the tensile strength and elongation were then 2600 lbs. and 465%, respectively, the former representing a loss of 5.5% and the latter a loss of 27.4%. These losses are considerably lower than those occurring with certain other formulations of this type, incorporating other known plasticizers.

EXAMPLES 23 AND 24

The following examples illustrate use of refined tall oil and of a prepared mixture approximating the general composition of tall oil.

In Example 23 the tall oil used was initially prepared by heating the tall oil for several hours at a temperature of 300° C., after which the thus purified tall oil was heated with 10% sulfur for 4 hours at 160° C.

In Example 24 a mixture of soya bean fatty acids and WW wood rosin was prepared in the proportion of 50% of each, and then this mixture was heated with 10% sulfur for 4 hours at 160° C.

In both of these examples the formulation was in accordance with Formulation A referred to above, the loading of semi-reenforcing black being at 40%. The quantity of sulfurized plasticizer used was 10%, as in Examples 1 to 7.

Certain of the characteristics for the optimum cures (25 minutes for Example 23 and 20 minutes for Example 24 at 138° C.) are indicated in Table VI below.

Table VI

| Ex. No. | Tens. | Mod. | Elong. | Tear Cold | Tear Hot |
|---|---|---|---|---|---|
| 23 | 1,860 | 310 | 880 | 158 | 69 |
| 24 | 1,840 | 260 | 910 | 146 | 74 |

I claim:

1. A synthetic rubber composition containing a butadiene-styrene co-polymer, a semi-reenforcing furnace black, and sulfurized tall oil of sticky viscous consistency, said composition, when vulcanized, having a cold tear resistance of at least 140 lbs. and hot tear resistance at 70° C. of at least 75 lbs. and further having a modulus not over 700 lbs., at 300% elongation.

2. A composition in accordance with claim 1 and further having a tensile strength of at least 1200 lbs.

3. A composition in accordance with claim 1 and further having an elongation of at least 650%.

4. A composition in accordance with claim 1 in which the modulus at 300% elongation is not higher than 500 lbs.

5. A synthetic rubber composition containing a butadiene-styrene co-polymer, a semi-reenforcing furnace black in an amount from 20% to 100% of said co-polymer, and sulfurized tall oil of sticky viscous consistency in an amount from 8% to 12% of said co-polymer, said composition, when vulcanized, being characterized by a tensile strength of at least 1200 lbs., an elongation of at least 650%, and cold tear resistance of at least 190 lbs., hot tear resistance of at least 90 lbs. and a modulus not above 500 lbs. at 300% elongation.

6. A composition in accordance with claim 5 which, when vulcanized, has a tensile strength of at least 1600 lbs.

7. A synthetic rubber composition containing a butadiene-styrene co-polymer, carbon black, and sulfurized tall oil of sticky viscous consistency, the amount of carbon black being from 20% to 100% of the co-polymer and the amount of sulfurized tall oil being from 1% to 25% of the co-polymer.

8. A composition in accordance with claim 7 in which the carbon black employed is a reenforcing black, said composition, when vulcanized, having a tensile strength above 2400 lbs. and characterized by high retention of tensile strength and elongation after protracted heating.

9. A composition in accordance with claim 7 in which the carbon black is a fine thermal black.

NICHOLAS L. KALMAN.

REFERENCES CITED

The following references are of record in the file of this patent:

UNITED STATES PATENTS

| Number | Name | Date |
|---|---|---|
| 1,907,380 | Baer | May 2, 1933 |
| 1,938,731 | Tschunkur et al. | Dec. 12, 1933 |

FOREIGN PATENTS

| Number | Country | Date |
|---|---|---|
| 618,592 | Germany | Sept. 11, 1935 |

Certificate of Correction

Patent No. 2,480,478 August 30, 1949

NICHOLAS L. KALMAN

It is hereby certified that errors appear in the printed specification of the above numbered patent requiring correction as follows:

Column 3, line 51, for the word "specified" read *specific*; column 4, line 20, strike out "in formulations of the type used in" and insert instead *or when employing fine thermal blacks*;

and that the said Letters Patent should be read with these corrections therein that the same may conform to the record of the case in the Patent Office.

Signed and sealed this 17th day of January, A. D. 1950.

[SEAL]

THOMAS F. MURPHY,
*Assistant Commissioner of Patents.*